United States Patent [19]

Collin

[11] Patent Number: 4,714,720

[45] Date of Patent: Dec. 22, 1987

[54] BROMINATED POLYETHERPOLYOLS, PROCESS FOR THEIR PREPARATION AND THE USE OF BROMINATED POLYETHERPOLYOLS IN THE MANUFACTURE OF RIGID POLYURETHANE FOAMS

[75] Inventor: André Collin, Ligny, Belgium

[73] Assignee: Solvay & Cie (Société Anonyme), Brussels, Belgium

[21] Appl. No.: 917,473

[22] Filed: Oct. 10, 1986

[30] Foreign Application Priority Data

Oct. 10, 1985 [FR] France .................................. 85 15166

[51] Int. Cl.$^4$ .............................................. C08G 18/14
[52] U.S. Cl. ...................................... 521/171; 568/614
[58] Field of Search ......................... 521/171; 568/614

[56] References Cited

U.S. PATENT DOCUMENTS 3,936,425  2/1976  Tomomatsu .................. 260/77.5
4,002,689  1/1977  Tomatsu ....................... 260/615

FOREIGN PATENT DOCUMENTS 1502050  10/1967  France .

OTHER PUBLICATIONS

Abstract of Japanese Application No. 52-30376; Document number 53-115797, Oct. 8, 1978.

*Primary Examiner*—Maurice J. Welsh

*Attorney, Agent, or Firm*—Spencer & Frank

[57] ABSTRACT

Polyetherpolyols corresponding to the general formula:

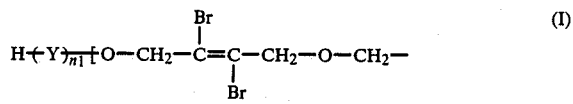

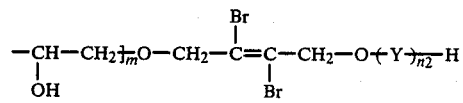

in which:
  Y denotes oxyalkylene radicals derived from alkene oxides,
  m denotes a number such that $1 \leq m \leq 2$ and $n_1$ and $n_2$ denote numbers such that $2 \leq (n_1 + n_2) \leq 5$.

The brominated polyetherpolyols are prepared by the condensation of $(m+1)$ moles of 2-butyne-1,4-diol with m moles of epichlorohydrin in the presence of m moles of a strong base, followed by the addition of $(n_1 + n_2)$ moles of alkene oxide and, finally, by a partial bromination.

These brominated polyetherpolyols may be employed, by themselves, or mixed with conventional unhalogenated polyetherpolyols, in the manufacture of rigid polyurethane foams.

6 Claims, No Drawings

BROMINATED POLYETHERPOLYOLS, PROCESS FOR THEIR PREPARATION AND THE USE OF BROMINATED POLYETHERPOLYOLS IN THE MANUFACTURE OF RIGID POLYURETHANE FOAMS

The present invention relates to new brominated polyetherpolyols, a process for their preparation and the use of brominated polyetherpolyols in the manufacture of rigid polyurethane foams.

Rigid polyurethane foams find many and diverse industrial applications, particularly in the fields of construction, insulation and furnishing, where fire-resistance is an indispensable property.

There are a number of ways of imparting fire-resistance properties to polyurethane foams. A well known process consists in incorporating into foams flameproofing additives such as antimony oxide or alternatively halogen-containing and/or phosphorus-containing compounds such as tris(dibromopropyl) or tris(dichloropropyl) phosphates, chlorinated biphenyls and halogenated hydrocarbons. These additives, which are not chemically bonded to the base polymer, are incapable of ensuring a permanent, uniformly distributed fire-resistance. Furthermore, as a general rule, they have a plasticizing effect on the foam and consequently degrade its mechanical properties, especially its compressive strength and its dimensional stability.

Another known means consists in the use of halogenated polyetherpolyols which ensure that the fire-resistance of the resultant polyurethane foams is permanent. Japanese Patent Application JA-A-No. 53-115797 of Feb. 22, 1977 (Mitsui Toatsu Kagaku K. K.) and French Patent FR-A-No. 1,502,050 of Oct. 5, 1966 (P,acu/e/chiney-Saint-Gobain) describe dibrominated polyetherdiols whose molecule contains a 1,4-dioxy-2,3-dibromo-2-butenylene radical. These brominated polyetherdiols are suitable for the manufacture of polyurethane foams which have a permanent fire-resistance. However, in view of their low functionality, equal to two, the resultant rigid foams exhibit mediocre mechanical properties. The abovementioned French patent also provides for the possibility of using mixtures of the said dibrominated polyetherdiols with unhalogenated polyetherpolyols with a functionality higher than 2, the result of this being to increase the mean functionality of the mixture and hence the mechanical properties of the resultant rigid polyurethane foams. Nevertheless, this improvement in the mechanical properties is obtained only at the expense of the bromine content and hence of the fire-resistance of the rigid polyurethane foams.

French Patent FR-A-No. 1,350,425 of Mar. 12, 1963 (Olin Mathieson) describes the use, for the manufacture of polyurethane foams, of chlorinated or brominated polyetherpolyols which are polyepichlorohydrins manufactured by the addition of epichlorohydrin or epibromohydrin to unhalogenated monomeric polyhydric alcohols containing at least two hydroxyl groups. These halogenated polyetherpolyols, whose particular characteristic features are halohydrin end groups, are unstable when stored in the presence of the amino compounds which are widely employed in the formulation of premixes for polyurethane foams. Furthermore, the resultant polyurethane foams produced by their reaction with organic polyisocyanates exhibit mediocre dimensional stability.

Belgian Patent BE-A-No. 798,674 of Apr. 25, 1973 (Solvay & Cie) describes chlorobrominated polyetherpolyols which are also derived from epichlorohydrin and whose particular characteristic feature is the presence of alphadiol end groups. The cellular polyurethanes manufactured with the involvement of the said halogenated polyetherpolyols exhibit excellent mechanical properties and, especially, a good dimensional stability, in addition to good fire-resistance. Nevertheless, the relatively high viscosity of these polyetherpolyols makes their use rather complicated. In addition, although the premixes of these polyetherpolyols with amino catalysts are more stable than those based on polyepihalohydrins, their storage stability is not of the best.

The purpose of the present invention, as the latter is characterized in the claims, is to provide a class of new brominated polyetherpolyols which do not have the abovementioned disadvantages.

The brominated polyetherpolyols according to the invention correspond to the general formula $$H{\mathrm{+}}Y{\mathrm{\rightarrow}}_{n_1}{\mathrm{+}}O-CH_2-\underset{\underset{Br}{|}}{\overset{\overset{Br}{|}}{C}}=C-CH_2-O-CH_2- \quad (I)$$

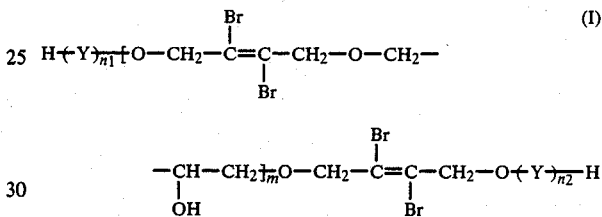

in which:

Y denotes oxyalkylene radicals derived from ethylene oxide, propylene oxide and/or butylene oxide, m denotes a number such that $1 \leq m \leq 2$, and $n_1$ and $n_2$ denote numbers such that $1 \leq (n_1 + n_2) \leq 5$.

Thus, the halogen which is present in the brominated polyetherpolyols according to the invention is exclusively vinylic bromine which is particularly stable chemically towards amino catalysts.

The brominated polyetherpolyols according to the invention are the result of successive condensation and addition reactions and consist of mixtures of brominated polyetherpolyols.

This is why the general formula (I) must be determined statistically. The parameters m, $n_1$ and $n_2$ denote mean values in this formula. Similarly, the oxyalkylene radicals $(Y)_{n_1}$ and $(Y)_{n_2}$ can equally well denote the formulae

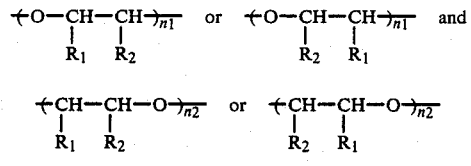

in which the radicals $R_1$ and $R_2$ independently of each other denote hydrogen, a methyl group or an ethyl group, depending on the alkene oxide used.

The preferred brominated polyetherpolyols according to the invention correspond to the general formula (I) above, in which:

m denotes a number such that $1 \leq m \leq 2$ and $n_1$ and $n_2$ denote numbers such that $1 \leq (n_1 + n_2) \leq 3$.

Preference is given, furthermore, to the brominated polyetherpolyols of general formula (I) in which Y denotes oxyalkylene radicals derived from propylene oxide and/or butylene oxide and, more particularly solely from propylene oxide.

Brominated polyetherpolyols according to the invention which are especially preferred are consequently those corresponding to the general formula (I) in which:

Y denotes oxyalkylene radicals derived from propylene oxide, m denotes a number such that $1 \leq m \leq 2$ and $n_1$ and $n_2$ denote numbers such that $1 \leq (n_1+n_2) \leq 3$.

Brominated polyetherpolyols according to the invention which are most especially preferred are those corresponding to the general formula (I) in which:

Y denotes oxyalkylene radicals derived from propylene oxide, m denotes a number equal to 1, and $n_1$ and $n_2$ denote numbers such that $(n_1+n_2)$ is equal to 1.

The present invention is also intended to provide a process for the preparation of the brominated polyetherpolyols according to the invention. This process consists, in a first stage, in condensing $(m+1)$ moles of 2-butyne-1,4-diol with m moles of epichlorohydrin in the presence of m moles of a strong base, to obtain an unsaturated polyetherpolyol of general formula:

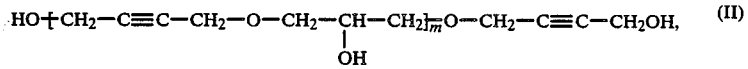

in a second stage, in adding $(n_1+n_2)$ moles of alkene oxide(s) in a basic medium to the unsaturated polyetherpolyol (II) from the preceding stage, to obtain an unsaturated polyetherpolyol of general formula:

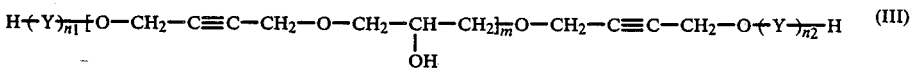

and, in a third stage, in adding $(m+1)$ moles of bromine to the unsaturated polyetherpolyol (III) from the preceding stage.

In practice, the first two stages are conveniently carried out in the absence of organic solvent at moderate temperatures of between 50° and 80° C., approximately. The base, which serves both as a reactant and as an anionic catalyst in the first stage and solely as an anionic catalyst in the second stage, may be chosen from strong inorganic bases such as sodium and potassium hydroxides and, equally well, from strong organic bases such as alkylammoniums. Nevertheless, preference is given to strong inorganic bases and especially sodium hydroxide. It is advantageous to use a slight excess of base over the stoichiometric quantity in the first stage, and this will also serve as catalyst in the second stage.

The third stage (partial bromination of acetylenic unsaturations) is preferably performed in a solvent medium at temperatures of between 20° and 50° C., approximately. By way of examples of solvents which can be used in the bromination stage, there may be mentioned methyl alcohol, 1,2-dichloroethane, chloroform, methylene chloride and mixtures thereof.

The brominated polyetherpolyols according to the invention are brownish liquids whose dynamic viscosity at 25° C. is generally less than 40 Pa s. They have a mean functionality of between 3 and 4, a hydroxyl value which is generally between 185 and 284 and, more particularly, between 210 and 284 mg KOH/g of brominated polyetherpolyol and a bromine content greater than 40% by weight and generally greater than 45% by weight. Furthermore, the brominated polyetherpolyols according to the invention are miscible in all proportions with the traditional polyetherpolyols used for rigid polyurethane foams and have a markedly greater storage stability in the presence of the amino compounds which are generally employed in the formulation of premixes for polyurethane foams.

A surprising feature of the brominated polyetherpolyols according to the invention is the fact that, at a molecular weight equivalent to that of the chlorobrominated polyetherpolyols according to Belgian Patent BE-A-No. 798,674, they are much richer in halogen —and hence markedly more efficient from the standpoint of flameproofing—without their viscosity being higher, quite the opposite, than that of the abovementioned chlorobrominated polyetherpolyols.

The new brominated polyetherpolyols according to the invention are most especially suitable for the manufacture of rigid polyurethane foams which are permanently flameproofed, in addition to having good dimensional stability.

The present invention also relates to the use of the brominated polyetherpolyols according to the invention in the manufacture of rigid polyurethane foams. In this application, and, depending on the degree of flameproofing which is sought, the brominated polyetherpolyols may be employed by themselves or mixed with traditional unhalogenated polyetherpolyols. By way of information, the use of the brominated polyetherpolyols according to the invention as the sole polyetherpolyols permits the manufacture of polyurethane foams rated as $M_1$ in the external radiator test (French Standard NFP 92,501). The use of mixtures of brominated polyetherpolyols according to the invention with unhalogenated conventional polyetherpolyols such as, for example, the products of addition of alkene oxides and especially of propylene oxide to monomeric polyhydric alcohols, containing from 20 to 50 parts by weight of brominated polyetherpolyols according to the invention, makes it possible to produce polyurethane foams which successfully pass the $B_2$ test (German Standard DIN 4102-$B_2$).

The general conditions for the manufacture of rigid polyurethane foams flameproofed with the aid of brominated polyetherpolyols according to the invention, used by themselves or mixed with conventional unhalogenated polyetherpolyols, are those which are usually employed for the manufacture of rigid polyurethane foams based on polyetherpolyols and, furthermore, well known to the specialist.

The rigid polyurethane foams prepared with the aid of the brominated polyetherpolyols according to the invention are thus produced by reacting brominated polyetherpolyols, by themselves or mixed with unhalogenated polyetherpolyols with organic polyisocyanates, in the presence of a foaming agent and one or more reaction catalysts and, if desired, in the presence of water and/or of low molecular weight diols or triols, emulsifying agents and/or stabilizers, filler substances, pigments, and the like.

The formulations may also contain minor quantities of unreactive flameproofing additives such as, for example, unreactive halogen and/or phosphorus compounds.

The theoretical quantity of polyisocyanate (corresponding to an NCO value=100) is calculated in a known manner as a function of the hydroxyl value of the polyetherpolyol(s) and, where appropriate, of the water and/or the low molecular weight diols and triols which are present in the formulation. A slight excess of polyisocyanate is advantageously used so as to ensure an isocyanate value of 105 to 130, which improves the heat distortion resistance of the resultant polyurethane foam.

The following examples illustrate the invention without, however, limiting it.

Examples 1 and 2 illustrate the preparation of brominated polyetherpolyols according to the invention. Examples 3 to 7 illustrate the use of brominated polyetherpolyols according to the invention for the production of polyurethane foams. In Examples 3 and 4 the brominated polyetherpolyols prepared in Example 1 are employed. In Examples 5, 6 and 7 the brominated polyetherpolyols prepared in Example 2 are employed.

The unhalogenated polyetherpolyol employed in Examples 4, 5 and 6 is a polyetherpolyol based on propylene oxide and on sorbitol, with a hydroxyl value of 495 mg KOH/g, marketed by Carbochimique under the name Tercarol RF 55.

The unhalogenated polyetherpolyol employed in Example 7 is a polyetherpolyol based on propylene oxide and on sucrose, with a hydroxyl value of 495 mg KOH/g, marketed by Carbochimique under the name of Tercarol RF 33.

EXAMPLE 1

Example 1 illustrates the preparation of brominated polyetherpolyols of general formula (I) in which: Y denotes oxyalkylene radicals derived from propylene oxide, $m = 1.13$ $(n_1 + n_2) = 2.20$.

1720 g (20 moles) of 2-butyne-1,4-diol and 980.5 g (10.6 moles) of epichlorohydrin are introduced in succession into a thermostatically controlled 10-liter reactor fitted with a stirrer, a thermometer, a reflux condenser and a dropping funnel.

The mixture is heated at 60° C. until a homogeneous liquid phase is obtained. 445 g (11.13 moles) of solid sodium hydroxide are then added over 60 minutes while the temperature of the reaction mixture is maintained at 60° C. After a maturing period of one hour at 60° C., the condensation reaction (first stage) is complete. A heterogeneous mixture of polycondensate (product II) (2314 g), precipitated sodium chloride (387 g), residual sodium hydroxide (21 g) and water (191 g) is obtained. The water is removed by evaporation at 80° C. under reduced pressure. The reaction mixture is then subjected to a purge with hot (80° C.) dry nitrogen.

The temperature is then restored to 60° C. and 1199 g (20.68 moles) of propylene oxide are added over two hours while the temperature of the reaction mixture is maintained at 60° C. After a maturing period of two hours at 60° C., the reaction of addition of propylene oxide to the hydroxyacetylene groups of product (II) is complete (second stage).

The temperature of the reaction mixture is reduced to 30° C. before the latter is diluted by adding 557 g of methyl alcohol and 1671 g of methylene chloride. 3200 g (20 moles) of bromine are then added over four hours with energetic stirring while the temperature is maintained between 30° and 35° C. After a maturing period of two hours at 30° C., the partial bromination of the acetylenic unsaturations (third stage) is complete. The brominated polyetherpolyol is purified from the sodium chloride formed during the condensation stage (first stage) by the addition of 3000 g of slightly alkaline water, followed by a phase separation for two hours at ambient temperature. The sodium chloride and the methyl alcohol used in the bromination are separated off in the light aqueous phase, and the dense organic phase consisting substantially of the brominated polyetherpolyol and of methylene chloride is drained and is then subjected to an evaporation at 80° C. under reduced pressure. 6510 g (97% yield) of a brownish oil having the following characteristics are isolated:

|  | Theoretical values | Measured values |
|---|---|---|
| Molecular weight | 715 | — |
| Mean functionality | 3.13 | — |
| Bromine content, % | 47.6 | 46.8 |
| Hydroxyl value, mg KOH/g | 245 | 240 |
| Density, g/cm³ | — | 1.7 |
| Dynamic viscosity at 25° C., Pa s | — | 22 |

EXAMPLE 2

Example 2 illustrates the preparation of brominated polyetherpolyols of general formula (I) in which: Y denotes oxyalkylene radicals derived from propylene oxide, $m = 1$ $(n_1 + n_2) = 1$.

Using the apparatus of Example 1 and under the general conditions of Example 1, the following are reacted in succession in three stages:

(1) 1720 g (20 moles) of 2-butyne-1,4-diol with 925 g (10 moles) of epichlorohydrin, in the presence of of 420 g (10.5 moles) of sodium hydroxide, (2) 580 g (10 moles) of propylene oxide are reacted with the product of reaction (1), (3) after dilution of the reaction mixture with 760 g of methyl alcohol and 3293 g of 1,2-dichloroethane, the product of reaction (2) is reacted with 3200 g of bromine (20 moles).

5775 g (95% yield) of a brownish oil having the following characteristics are obtained:

|  | Theoretical values | Measured values |
|---|---|---|
| Molecular weight | 606 | — |
| Mean functionality | 3 | — |
| Bromine content, % | 52.8 | 52 |
| Hydroxyl value, mg KOH/g | 277 | 270 |
| Density, g/cm³ | — | 1.8 |
| Dynamic viscosity at 25° C., Pa s | — | 38 |

EXAMPLE 3

Example 3 illustrates the use of brominated polyetherpolyols according to Example 1 in the manufacture of a flameproof polyurethane foam.

The following are introduced into a 400-cm³ polyethylene receptacle: 100 g of brominated polyetherpolyols prepared in Example 1, 1 g of water, 0.5 g of silicone DC 193, 1.5 g of N,N-dimethylcyclohexylamine and 19 g of trichlorofluoromethane (R₁₁). This mixture is stirred in order to make it perfectly homogeneous. 81.3 g of crude methylene bis(4-phenyl isocyanate) (MDI) are then added. The resultant mixture is stirred for 15 seconds and is then poured into a mould and allowed to cure at ambient temperature.

The ingredients employed for the production of the polyurethane foam are listed in Table I, appended. The properties of the polyurethane foam are listed in Table II, appended.

EXAMPLES 4 to 7

Examples 4 to 7 are performed under the general conditions of Example 3.

The ingredients used in the production of the polyurethane foams are listed in Table I, appended, the properties of the polyurethane foams are listed in Table II, appended.

TABLE I

| Ingredients employed in the production of rigid polyurethane foams, g | | | | | |
|---|---|---|---|---|---|
| | Example number | | | | |
| Ingredients | 3 | 4 | 5 | 6 | 7 |
| Unhalogenated polyetherpolyol Tercarol RF 55 | — | 45 | 70 | 70 | — |
| Tercarol RF 33 | — | — | — | — | 10 |
| Brominated polyetherpolyols according to Example 1 | 100 | 55 | — | — | — |
| Brominated polyetherpolyols according to Example 2 | — | — | 25.4 | 27 | 72 |
| Water | 1 | 1 | 1 | 1 | 1 |
| Ethylene glycol | — | — | 1.6 | — | — |
| Glycerine | — | — | — | — | 5 |
| Silicone | 0.5 | 1 | 1 | 1 | 1 |
| N,N—Dimethylcyclohexylamine | 1.5 | 2 | 1.5 | 1.5 | 0.8 |
| Trichlorofluoromethane | 19 | 22 | 26 | 24 | 22 |
| Tris(chloropropyl) phosphate | — | — | 13 | 13 | 13 |
| Crude MDI | 81.3 | 111.5 | 134 | 127.3 | 102.9 |
| Isocyanate value | 110 | 110 | 110 | 110 | 110 |

TABLE II

| Properties of the rigid polyurethane foams | | | | | |
|---|---|---|---|---|---|
| | Example number | | | | |
| Properties | 3 | 4 | 5 | 6 | 7 |
| Cream time, seconds | 26 | 25 | 22 | 23 | 19 |
| Filament time, seconds | 82 | 80 | 85 | 95 | 58 |
| Rise time, seconds | 115 | 120 | 115 | 130 | 85 |
| Tack-free time, seconds | 135 | 105 | 135 | 150 | 95 |
| Apparent density, kg/m³ | 32.4 | 33.7 | 33.8 | 32.9 | 32.3 |
| Dimensional stability L/L, %, according to French Standard NFT 56 122 | | | | | |
| after 7 days at 100° C., ambient humidity | +4.0 | +2.0 | +1.5 | +1.5 | +2.0 |
| after 7 days at 70° C., 90% RH | +2.5 | +1.5 | +2.0 | +1.5 | +2.0 |
| after 7 days at −30° C., ambient humidity | −3.5 | 0 | 0 | 0 | −0.5 |
| External radiator test according to French Standard NFP 92,501, rating | M₁ | — | — | — | M₁ |
| inflammation period, seconds | 1 | — | — | — | <5 |
| DIN 4102-B₂ test, rating | — | B₂ | B₂ | B₂ | — |
| Procedure K, flame height, cm | — | 12.3 | 12.5 | 13.0 | — |
| LOI (Limiting oxygen index) (ASTM Standard D2863) | 29.5 | 23 | n.d.* | n.d.* | 30.5 |

*n.d. = not determined

I claim:

1. Brominated polyetherpolyols of general formula $$H(Y)_{n_1}[O-CH_2-\underset{Br}{\underset{|}{C}}=\underset{Br}{\underset{|}{C}}-CH_2-O-CH_2-$$

$$-\underset{OH}{\underset{|}{CH}}-CH_2]_m-O-CH_2-\underset{Br}{\underset{|}{C}}=\underset{Br}{\underset{|}{C}}-CH_2-O(Y)_{n_2}H$$

in which:

Y denotes oxyalkylene radicals derived from ethylene oxide, propylene oxide and/or butylene oxide, m denotes a number such that $1 \leq m \leq 2$, and $n_1$ and $n_2$ denote numbers such that $1 \leq (n_1 \leq n_2) \leq 5$.

2. Brominated polyetherpolyols according to claim 1, characterized in that m denotes a number such that $1 \leq m \leq 2$ and $n_1$ and $n_2$ denote numbers such that $n \leq (n_1 + n_2) \leq 3$.

3. Brominated polyetherpolyols according to claim 1, characterized in that Y denotes oxyalkylene radicals derived from propylene oxide.

4. Brominated polyetherpolyols according to claim 3, characterized in that m denotes a number equal to 1, and $n_1$ and $n_2$ denote numbers such that $(n_1 + n_2)$ is equal to 1.

5. Process for the manufacture of polyetherpolyols according to claim 1, characterized in that, in a first stage, (m+1) moles of 2-butyne-1,4-diol are condensed with m moles of epichlorohydrin in the presence of m moles of a strong base, in a second stage, $(n_1+n_2)$ moles of alkene oxide(s) are added in a basic medium to the unsaturated polyetherpolyol from the preceding stage, and, in a third stage, (m+1) moles of bromine are added to the unsaturated polyetherpol from the preceding stage.

6. Rigid polyurethane foams prepared by reaction of the brominated polyetherpolyols according to claim 1, by themselves or mixed with unhalogenated conventional polyetherpolyols.

* * * * *